UNITED STATES PATENT OFFICE.

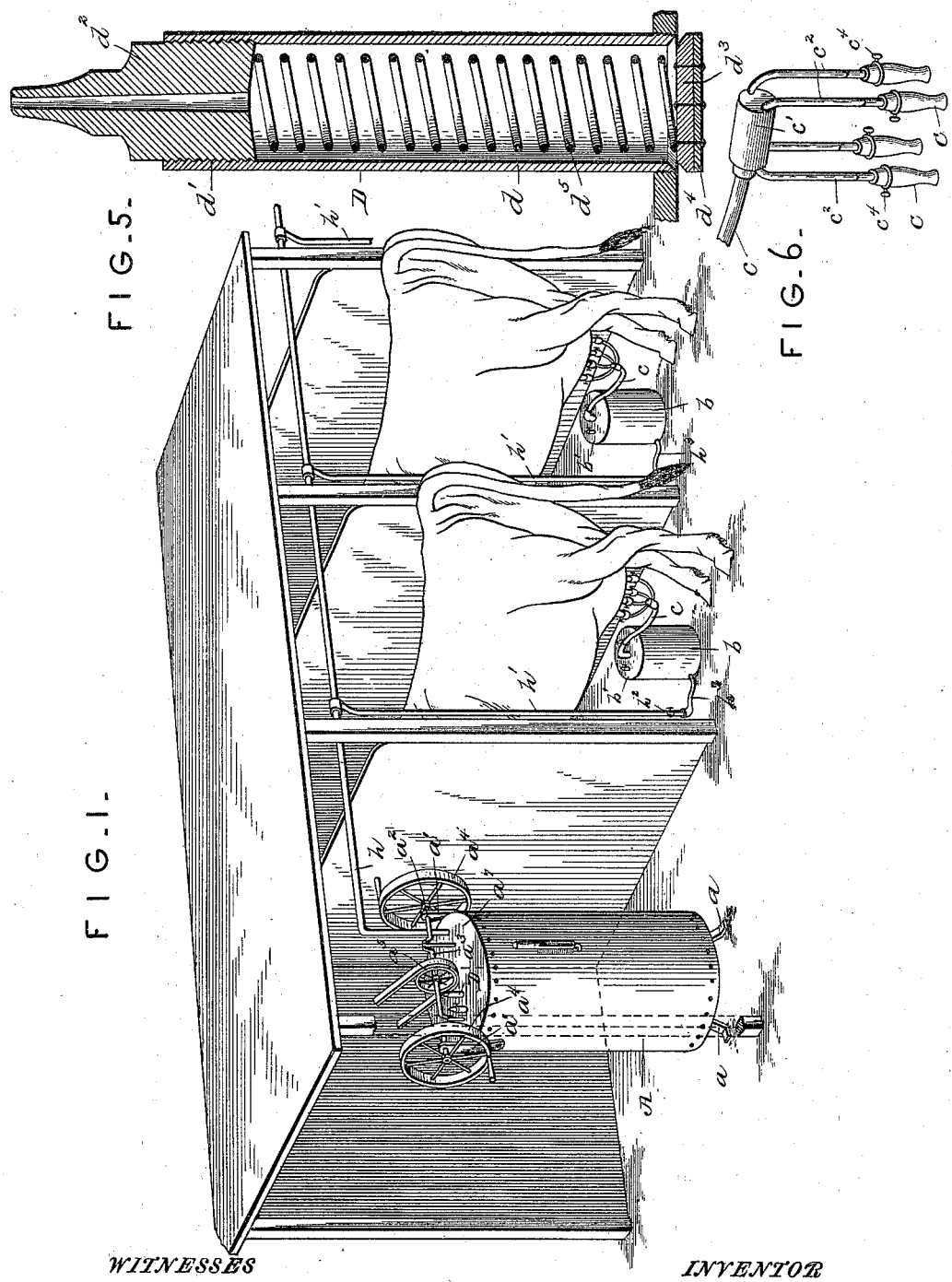

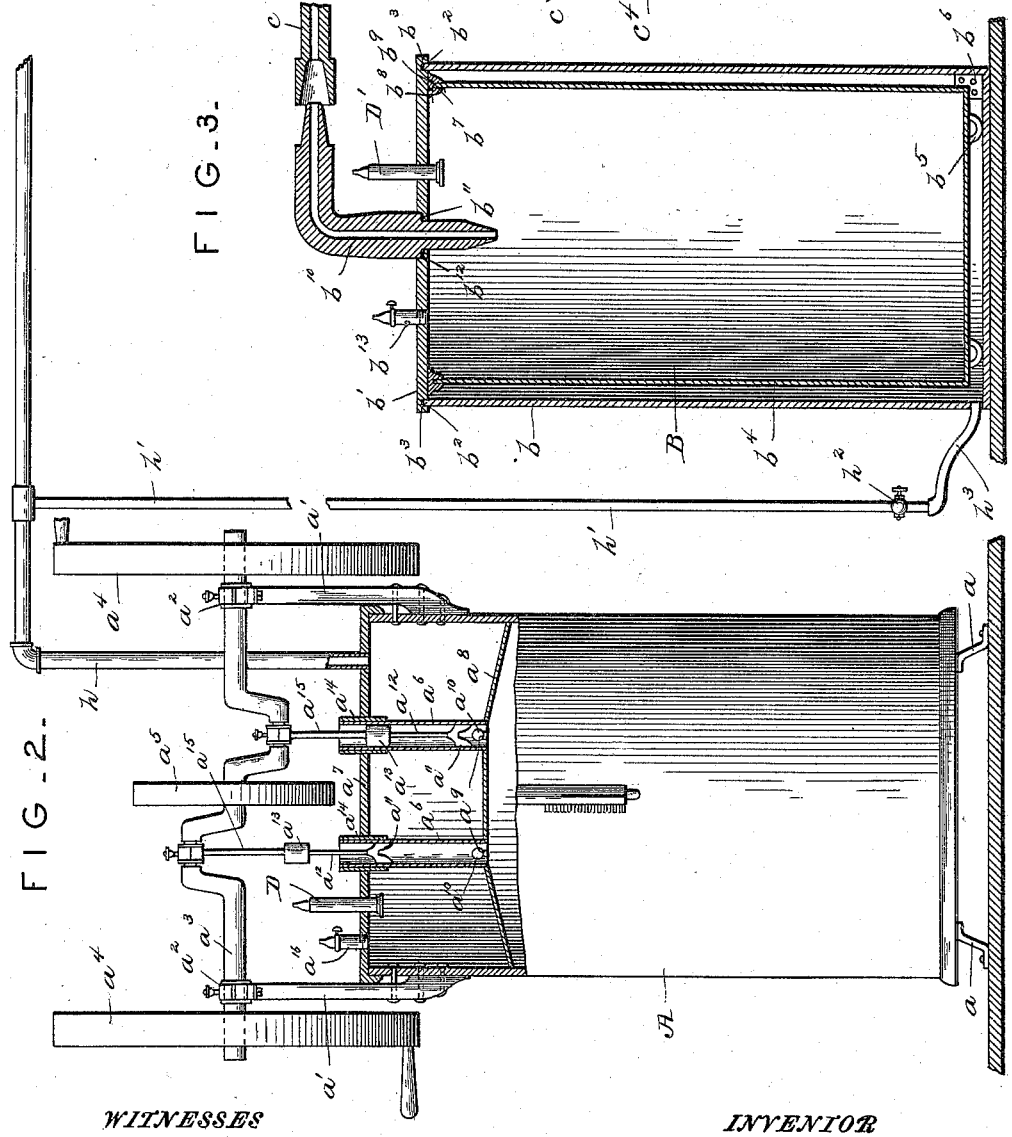

DANIEL KLEIN, OF GLEN, NEBRASKA, ASSIGNOR OF ONE-HALF TO THE DE LAVAL SEPARATOR COMPANY.

MILKING APPARATUS.

SPECIFICATION forming part of Letters Patent No. 598,423, dated February 1, 1898.

Application filed September 1, 1896. Serial No. 604,541. (No model.)

*To all whom it may concern:*

Be it known that I, DANIEL KLEIN, a citizen of the United States, residing at Glen, in the county of Sioux and State of Nebraska, have invented certain new and useful Improvements in Milking Apparatus; and I do hereby declare the following to be a full, clear, and exact description of the invention, such as will enable others skilled in the art to which it appertains to make and use the same.

This invention relates to improvements in milking apparatus, and has more particular relation to apparatus operated by a vacuum to withdraw the milk from a cow's udder.

The invention consists of the combination, with a vacuum-tank, of a milk-receiving receptacle connected thereto and comprising an outer vacuum-chamber and an inner milk-receptacle communicating therewith and means for connecting the inner milk-receptacle with a cow's udder.

The invention also consists in certain other novel construction, combination, and arrangement of parts, all of which will hereinafter be more particularly set forth and claimed.

In the accompanying drawings, forming part of this specification, Figure 1 represents a side elevation of my improved apparatus in operation. Fig. 2 represents a central vertical section, partly in side elevation, of the vacuum-tank. Fig. 3 represents a detail central vertical section through the milk-receptacle. Fig. 4 represents an enlarged detail central vertical section of one of the teat-cups. Fig. 5 represents a detail central vertical section through the safety-valve which is applied to the vacuum-tank and milk-receptacle, and Fig. 6 represents a detail perspective view of a series of teat-cups attached to a common receiving-pipe.

A in the drawings represents the vacuum-tank; B, the milk-receptacle; C C, the teat-cups, and D D' the safety-valves.

The vacuum-tank A is of any desired form of construction and is mounted upon suitable supporting-legs $a$. This tank is of such strength as to fully resist the action of the vacuum created within the same and is provided upon each side near its upper edge with two upright standards $a'$, arranged upon diametrically opposite sides of the same. Journal-boxes $a^2$ $a^2$ are secured to the respective upper ends of said vertical standards and support the journal ends of a crank-shaft $a^3$. Fly or balance wheels $a^4$ $a^4$ are mounted upon the respective ends of said crank-shaft $a^3$ outside of the journal-boxes. A belt or pulley wheel $a^5$ is applied upon said shaft $a^3$ between its crank bends and is adapted to receive a suitable power-belt, (see Fig. 1,) whereby the said shaft $a^3$ is rotated to actuate the vacuum-pumps, as hereinafter described. These vacuum-pumps $a^6$ $a^6$ are mounted within the top $a^7$ of the vacuum-tank and each comprises a cylinder. The lower ends of the cylinders are braced against vibration by a lateral bracing-web $a^8$, connecting the lower ends of said cylinders to the inner walls of the vacuum-tank. Each of said cylinders $a^6$ is provided at its lower end with a small semispherical valve-seat $a^9$, upon which is mounted a spherical valve $a^{10}$, so that any upward pressure upon said valves will cause them to open, whereas a reverse pressure would reseat them. Each cylinder is provided with a valved piston $a^{11}$, connected by piston-rod $a^{12}$ to a slide $a^{13}$, mounted on vertical guides $a^{14}$. Each of the slides $a^{13}$ is connected to its respective crank bend of the shaft $a^3$ by a pitman-rod $a^{15}$.

It will be observed from the above that when the shaft $a^3$ is operated the pistons of the vacuum-pumps $a^6$ will be caused to rise and fall alternately, thereby pumping the air from the tank and forming a vacuum within the same. A cock $a^{16}$ is mounted in the cover $a^7$, so that when so desired the vacuum within the tank may be destroyed by permitting air to enter the same. To prevent the vacuum within the tank reaching an injurious degree of intensity, I provide a safety-valve D, mounted within the cover $a^7$ on said tank. This valve comprises a tube or cylinder $d$, provided at its upper end with interior screw-threads $d'$. An apertured plug $d^2$ is secured within the said upper end of said tube $d$ by means of screw-threads engaging the screw-threads $d'$ of said cylinder. A safety rubber valve $d^3$, provided with a stiffening-plate $d^4$, is mounted in the lower end of the said tube $d$ by means of a spiral steel spring $d^5$, which is attached to said valve and the plug $d^2$. This spring is so tempered that a pressure of fifteen pounds above the normal within the vacuum-tank will expand it one inch and thus open the valve and permit air to rush into the tank until the vacuum is reduced to its normal pressure. A pipe $h$, preferably of galvanized iron, communicates with the top of the vacuum-tank and extends to and through different portions of the stable or shed in which the cows are stalled. Branch pipes $h'$ extend from said pipe $h$ to the milk-receptacle B in each stall. Each of these pipes is provided at its lower end with a cock $h^2$ and is connected to its respective outer casing of its milk-receptacle B by a flexible rubber pipe $h^3$.

Each of the milk-receptacles B comprises an outer vacuum-tank $b$, a cover $b'$, fitting air-tight upon the same by means of an annular groove $b^2$ and a packing $b^3$, and an inner milk-receptacle proper, $b^4$. This latter receptacle is provided upon its bottom with supporting-legs $b^5$, that hold the bottom of said receptacle $b^4$ away from the bottom of the outer receptacle B, so that said receptacles will not stick together because of the vacuum within said outer receptacle. A perforated rim $b^6$ is applied to the bottom of the receptacle B to assist in supporting and bracing the lower edge of the receptacle $b^4$. The upper edge of said receptacle $b^4$ is seated in an annular groove $b^7$, formed in an annular flange $b^8$ of the lid or cover $d'$ of the receptacle B. Apertures $b^9$ are formed in said annular flange $b^8$ to permit the ready flow of air between the receptacles B and $b^4$, respectively. The lid $b'$ of the receptacle B is provided with an angular pipe-coupling $b^{10}$, seated in a recess $b^{11}$ in said cover, a packing $b^{12}$ being applied between said coupling and said cover to make an air-tight joint at this point. The upper end of the coupling $b^{10}$ is reduced in size to provide for the attachment of a flexible conducting-pipe $c$.

The cover $b'$ of the receptacle B is provided with a safety-valve D' and cock $b^{13}$, similar in construction to the valve D and cock $a^{16}$ and for similar purposes. The pipe $c$ is connected to a hard-rubber receptacle $c'$, which receptacle is a common outlet for all of the teat-cup pipes $c^2$. Each of these pipes $c^2$ is provided at its free end with a teat-cup C, formed of rubber and of such shape as to fit snugly over the cow's teat. Each of these caps is provided with a central passage $c^3$, adapted to be opened or closed by a turning plug $c^4$.

The operation of my apparatus is as follows: The shaft $a^3$ being set in motion actuates the pumps $a^6$ to create a vacuum within the tank A. When this vacuum has reached the proper limit, which may be indicated by any suitable gage, the cocks $h^2$ are opened and the teat-cups adjusted in position. The cocks $c^4$ are now opened and the action of the vacuum brought to bear upon the teats, which will immediately cause the milk to flow along through the pipes $c^2$, receptacle $c'$, pipe $c$, and into the receptacle $b^4$, the four streams of milk consolidating in the common receptacle $c'$. The suction is continued until the milk ceases to flow, when the safety-valve will automatically open with a loud hissing sound, thus calling the attention of the attendant, who will at once close the cock $h^2$ and open the cock $b^{13}$, which will completely destroy the vacuum in that particular milk-receptacle. This operation will cause the teat-cups to drop away from the teats, but will not in any way affect the operation of the remaining milkers, and each milk-receptacle will remain in operation until its respective indicator warns the attendant that all the milk has been withdrawn from the cow's udder.

As the air is exhausted from the outer casing $b$ the air from the inner casing $b^4$ rushes into the same through the upper perforations until the air from said inner casing is also exhausted, the pipe connection to said inner casing in the meantime also having its supply of air exhausted. The vacuum made by this action of the pump causes the milk to flow through the pipes $c$, as above described, and down into the casing $b^4$ through the nozzle $b^{10}$. The specific gravity of the milk entering the said casing $b^4$ will cause it to fall to the bottom of said casing, and thus prevent it passing through the apertures between the inner and outer casing.

The supply to the pipes $c$ must of course be cut off the instant the inner receptacle $b^4$ is filled, as otherwise the milk would flow from the inner receptacle into the outer.

Having now described my invention, what I claim as new, and desire to protect by Letters Patent, is—

1. In a milking apparatus the combination with a vacuum-pump, of a milk-receptacle connected thereto and comprising an outer vacuum-tank and an inner communicating milk-receptacle, and means connecting said inner receptacle with a cow's udder, substantially as described.

2. In a milking apparatus the combination with a vacuum-tank, of pumps connected thereto for creating a vacuum therein, a milk-receptacle connected to said tank and comprising an outer vacuum-chamber and an inner communicating milk-receiving receptacle, a flexible pipe connected to said inner milk-receptacle, and a plurality of teat-cups connected to said flexible pipe, substantially as described.

3. In a milking apparatus the combination with a vacuum-tank, of a crank-shaft mounted upon the same, pumps connected to said crank-shaft and connected to said tank for creating a vacuum within the same, a milk-receptacle connected to said tank and comprising an outer vacuum-chamber and an inner milk-receptacle communicating therewith, safety-valves in said tank and receptacle, and means for connecting the milk-receptacle with a cow's udder, substantially as described.

4. In a milking apparatus the combination with a vacuum-pump, of a milk-receptacle comprising an outer vacuum-chamber connected to said pump and having a grooved and flanged cover applied thereon, an inner milk-receptacle having its upper end seated in said flange of the top or lid, and means for connecting the milk-receptacle with a cow's udder, substantially as described.

5. In a milking apparatus the combination with a vacuum-pump, of a series of milk-receptacles connected to the same and each comprising an outer vacuum-chamber, and an inner milk-receptacle communicating therewith, suitable pipes for connecting each of the milk-receptacles with a cow's udder, and means for cutting off any one of the milk-receptacles from the main vacuum-tank, substantially as described.

6. In a milking apparatus the combination with a vacuum-pump, of a milk-receptacle connected to the same and comprising an outer vacuum-tank, a lid for the same, a perforated pendent flange upon said lid, a cock in said lid, a safety-valve in said lid, an inner milk-receptacle having its upper edge mounted in the perforated flange of the lid, and means for connecting the milk-receptacle with a cow's udder, substantially as described.

In testimony whereof I have signed this specification in the presence of two subscribing witnesses.

DANIEL KLEIN.

Witnesses:
CLIFTON L. FREEMAN,
CHAS. A. PUDDY.